(12) United States Patent
Mojdehi et al.

(10) Patent No.: US 11,826,768 B2
(45) Date of Patent: Nov. 28, 2023

(54) METHOD AND APPARATUS FOR ADAPTIVE CONTROL AND REAL-TIME EDGE TRACKING OF ADHESIVE AND SEALER DISPENSING

(71) Applicant: Ford Global Technologies, LLC, Dearborn, MI (US)

(72) Inventors: Ahmad Mojdehi, Ann Arbor, MI (US); David John Hill, Ann Arbor, MI (US); Jim Derry, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 25 days.

(21) Appl. No.: 17/198,946

(22) Filed: Mar. 11, 2021

(65) Prior Publication Data

US 2022/0288617 A1 Sep. 15, 2022

(51) Int. Cl.
*B05B 13/04* (2006.01)
*B25J 9/16* (2006.01)

(52) U.S. Cl.
CPC ......... *B05B 13/0431* (2013.01); *B25J 9/1684* (2013.01); *B25J 9/1694* (2013.01)

(58) Field of Classification Search
None
See application file for complete search history.

(56) References Cited

U.S. PATENT DOCUMENTS

| | | | |
|---|---|---|---|
| RE35,010 E * | 8/1995 | Price | B05B 13/0431 222/1 |
| 7,112,246 B2 | 9/2006 | Schucker | |
| 7,900,578 B2 * | 3/2011 | Hirose | B25J 9/0096 414/744.2 |
| 8,651,046 B1 * | 2/2014 | Davancens | B05C 5/0212 901/41 |
| 9,616,446 B2 * | 4/2017 | Hirota | B05B 9/0406 |
| 9,956,567 B2 * | 5/2018 | Albrecht | B24C 3/08 |
| 9,962,728 B2 * | 5/2018 | Lu | H05K 3/3485 |
| 10,189,187 B2 * | 1/2019 | Keating | B29C 64/227 |
| 10,195,649 B2 * | 2/2019 | Takikawa | B08B 3/024 |
| 10,201,839 B2 * | 2/2019 | Takikawa | B23Q 11/005 |
| 10,562,058 B2 * | 2/2020 | Hayama | B05B 13/0405 |

(Continued)

FOREIGN PATENT DOCUMENTS

| | | |
|---|---|---|
| DE | 102004021573 | 12/2005 |
| EP | 2254705 | 11/2012 |
| JP | 6303526 | 4/2018 |

*Primary Examiner* — Jethro M. Pence
(74) *Attorney, Agent, or Firm* — Burris Law, PLLC (57) ABSTRACT

A system for applying material to a part includes an application nozzle attached to a distal end of a robotic arm, a sensor coupled to the distal end of the robotic arm, an actuator mechanically coupled to the application nozzle, and a controller in communication with the actuator and configured to receive data from the sensor and detect a feature of the substrate. The robotic arm is configured to hold the application nozzle in a fixed position and/or traverse a predefined path such that the application nozzle traverses a predefined global bead path across and spaced apart from a substrate. The controller is configured to direct the actuator to move the application nozzle independent of the distal end of the robotic arm such that a bead of material flowing out of the application nozzle is applied to the substrate along a feature-relative bead path.

20 Claims, 11 Drawing Sheets

(56) References Cited

U.S. PATENT DOCUMENTS

| | | | |
|---|---|---|---|
| 10,776,949 B2 | 9/2020 | Haven et al. | |
| 10,913,162 B2* | 2/2021 | Takizawa | B25J 19/02 |
| 10,935,477 B2* | 3/2021 | Mojdehi | G05B 19/41875 |
| 10,974,268 B2* | 4/2021 | Jones | G08B 7/06 |
| 11,059,172 B2* | 7/2021 | Igarashi | B25J 9/1664 |
| 11,192,137 B2* | 12/2021 | Shang | B25J 19/023 |
| 11,294,347 B2* | 4/2022 | Miyamoto | G05B 19/402 |
| 11,420,432 B1* | 8/2022 | Mojdehi | B32B 37/1292 |
| 11,456,564 B2* | 9/2022 | Ikushima | H01R 13/502 |
| 11,491,651 B2* | 11/2022 | Chan | H04B 10/2589 |
| 11,491,788 B2* | 11/2022 | Tawata | B41J 3/4073 |
| 11,541,532 B2* | 1/2023 | Yoshino | B25J 11/0075 |
| 2004/0011284 A1* | 1/2004 | Schucker | B25J 19/02 |
| | | | 118/688 |
| 2005/0048195 A1* | 3/2005 | Yanagita | B05C 11/1013 |
| | | | 427/421.1 |
| 2005/0048196 A1* | 3/2005 | Yanagita | B05B 12/085 |
| | | | 427/421.1 |
| 2005/0143861 A1* | 6/2005 | Watanabe | B25J 9/1684 |
| | | | 700/264 |
| 2007/0000442 A1* | 1/2007 | Schucker | B25J 19/023 |
| | | | 118/713 |
| 2010/0180711 A1* | 7/2010 | Kilibarda | B25J 15/0483 |
| | | | 219/136 |
| 2016/0052296 A1* | 2/2016 | Grimes | B05D 1/02 |
| | | | 347/110 |
| 2016/0129466 A1* | 5/2016 | Turnbull | B05B 13/0431 |
| | | | 239/69 |
| 2017/0050213 A1* | 2/2017 | Pringle, IV | B05B 15/65 |
| 2017/0321316 A1* | 11/2017 | Barron | C23C 30/00 |
| 2018/0236485 A1* | 8/2018 | Weinmann | B05B 12/24 |
| 2018/0250955 A1* | 9/2018 | Herre | B05C 11/1015 |
| 2019/0240912 A1* | 8/2019 | Alves | B33Y 30/00 |
| 2022/0016669 A1* | 1/2022 | Shang | B05D 1/26 |
| 2022/0080454 A1* | 3/2022 | Shang | H04N 23/54 |

* cited by examiner

METHOD AND APPARATUS FOR ADAPTIVE CONTROL AND REAL-TIME EDGE TRACKING OF ADHESIVE AND SEALER DISPENSING

FIELD

The present disclosure relates to applying or dispensing adhesives and sealers and particularly to applying adhesives and sealers robotically.

BACKGROUND

The statements in this section merely provide background information related to the present disclosure and may not constitute prior art.

Joints between automotive panels often include an adhesive or sealant between the panels such that performance (e.g., corrosion resistance) of the joints is enhanced. However, variations in physical dimensions of panels and fixtures (e.g., due to panel and fixture tolerances) can result in less than desired placement of a bead of adhesive or sealant relative to an edge or edges of panels to be joined, which can result in joints with uneven or undesired adhesive application (e.g., squeeze-out and poor coverage).

The present disclosure addresses the issues of dispensing adhesive onto panels among other issues related to forming joints with adhesives included in the joints.

SUMMARY

This section provides a general summary of the disclosure and is not a comprehensive disclosure of its full scope or all of its features.

In one form of the present disclosure, a system for applying material to a part includes an application nozzle attached to a distal end of a robotic arm, a linear sensor coupled to the distal end of the robotic arm, an actuator mechanically coupled to and configured to move the application nozzle, and a controller in communication with the actuator and configured to receive image data from the linear sensor and detect a feature of the substrate. The robotic arm is configured to hold the application nozzle in a fixed position and/or traverse a predefined path such that the application nozzle traverses a predefined global bead path across and spaced apart from a substrate. Also, the controller is configured to direct the actuator to move the application nozzle independent of the distal end of the robotic arm such that a bead of material flowing out of the application nozzle is applied to the substrate along a feature-relative bead path.

In some variations, the feature is at least one of an edge of the substrate and a groove of the substrate.

In at least one variation the actuator is a one dimensional actuator, and in such variations, the one dimensional actuator and the linear sensor can be oriented parallel to each other.

In some variations, the actuator is a two-dimensional actuator, and in such variations, the two-dimensional actuator can be configured to move the application nozzle in a direction normal to the substrate such that the application nozzle maintains a predefined stand-off distance from the substrate as the application nozzle traverses the bead path across the substrate.

In at least one variation the actuator is a three-dimensional actuator, and in such variations, the three-dimensional actuator can be configured to move the application nozzle in a direction normal to the substrate such that the application nozzle maintains a predefined stand-off distance from the substrate as the application nozzle traverses the bead path across the substrate.

In some variations, the system includes an electromagnetic radiation (EMR) source and the linear sensor is a linear EMR sensor.

In at least one variation, the linear sensor comprises a 2D camera configured as a line scanner.

In some variations, the linear sensor comprises a 3D camera configured as a line scanner.

In at least one variation, the linear sensor is coupled to the distal end of the robotic arm upstream from the application nozzle and the controller is configured to direct the actuator to move the application nozzle with a time delay after the feature of the substrate is detected. In such variations the time delay can be a function of a predefined linear speed of the robotic arm. For example, a speed sensor can be coupled to and configured to detect a linear speed of the distal end of the robotic arm and the time delay is a function of a current linear speed of the distal end of the robotic arm detected by the speed sensor.

In another form of the present disclosure, a system for applying material to a part includes an application nozzle attached to a distal end of a robotic arm, a linear sensor coupled to the distal end of the robotic arm, an actuator mechanically coupled to and configured to move the application nozzle, and a controller in communication with the actuator and configured to receive image data from the linear sensor and detect a feature of the substrate. The robotic arm is configured to hold the application nozzle in a fixed position and/or traverse a predefined path such that the application nozzle traverses a predefined global bead path across and spaced apart from a substrate. Also, the controller is configured to direct the actuator to move the application nozzle independent of the distal end of the robotic arm such that a bead of material flowing out of the application nozzle is applied to the substrate along a feature-relative bead path.

In some variations, the feature is at least one of an edge of the substrate, a groove of the substrate, and a root of a groove of the substrate.

In at least one variation, the actuator is one of a one-dimensional actuator, a two-dimensional actuator and a three-dimensional actuator. In such variations the two-dimensional actuator and the three-dimensional actuator can be configured to move the application nozzle in a direction normal to the substrate such that the application nozzle maintains a predefined stand-off distance from the substrate as the application nozzle traverses the feature-relative bead path across the substrate.

In still another form of the present disclosure, a system for applying material to a part includes an application nozzle attached to a distal end of a robotic arm, a linear sensor coupled to the distal end of the robotic arm upstream from the application nozzle, an actuator mechanically coupled to and configured to move the application nozzle, and a controller in communication with the actuator. The robotic arm is configured to hold the application nozzle in a fixed position and/or traverse a predefined path such that the application nozzle traverses a predefined global bead path across and spaced apart from a substrate. The controller is configured to receive image data from the linear sensor and detect a feature of the substrate, and direct the actuator to move the application nozzle with a time delay after the feature of the substrate is detected and independent of the distal end of the robotic arm such that a bead of material flowing out of the application nozzle is applied to the substrate along a feature-relative bead path.

In some variations, the system includes a speed sensor coupled to and configured to detect a linear speed of the distal end of the robotic arm. And in at least one variation the time delay is a function of a current linear speed of the distal end of the robotic arm detected by the speed sensor.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
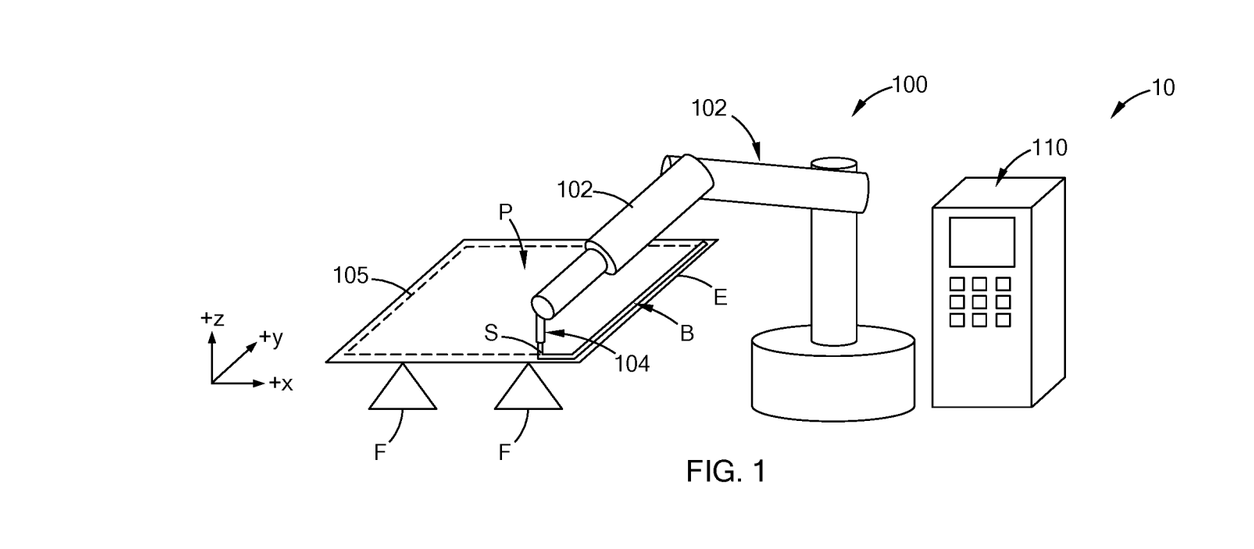
FIG. 1 is a traditional adhesive dispensing system.

Referring to FIG. 1, a traditional system 10 or applying or dispensing an adhesive and/or sealant 'S' (simply referred to herein as "adhesive") to a part or panel 'P' is shown. The panel P has one or more edges 'E' and in some variations the panel is held in a fixed position by one or more fixtures 'F' while a robot 100 with at least one robot arm 102 moves an application nozzle 104 across the panel P along a predefined bead path 105. The robot 100 is directed by a controller 110 and a bead 'B' of the adhesive S is applied to the panel P proximal to the edge E. In other variations, the application nozzle 104 is held in a fixed position and the panel P is moved relative to the application nozzle 104 by a robot (not shown) such that a bead 'B' of the adhesive S is applied to panel P proximal to the edge E. In either variation, it should be understood that the predefined bead path 105 is a global bead path with a position or path fixed or absolute relative to a robotic coordinate system. That is, as used herein the phrase "global bead path" refers to a bead path that is specific or fixed relative to coordinates defined for and/or by the robot 100.

Figure 2A:
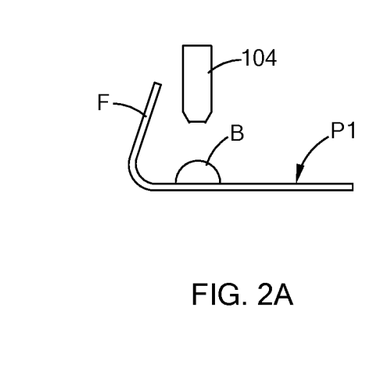
FIG. 2A is a cross-sectional view of a bead of adhesive dispensed onto an outer panel with a flange.
Figure 2B:
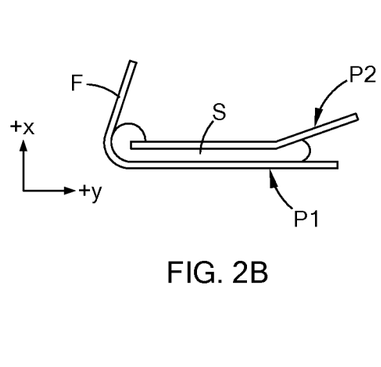
FIG. 2B is a cross-sectional view of an inner panel on the bead of adhesive in FIG. 2A.
Figure 2C:
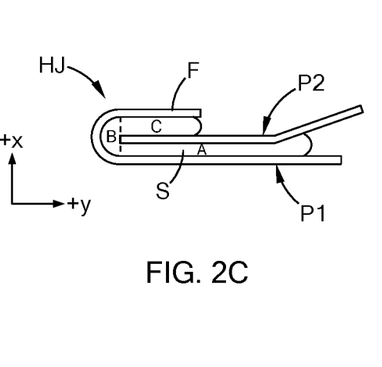
FIG. 2C is a cross-sectional view of the flange of the outer panel bent over the inner panel in FIG. 2B such that a hemmed joint is formed.

It should be understood that in some variations the bead B of adhesive S is used to form a joint between two panels. For example, and with reference to FIGS. 2A-2C, the traditional system 10 applies a bead B of the adhesive S onto an outer panel 'P1' with a flange as shown in FIG. 2A. Also, an inner panel 'P2' can be placed onto the bead B as shown in FIG. 2B, and the flange f of the inner panel P1 can be bent over the inner panel P2 such that a hemmed joint 'HJ' is formed. Applying or dispensing the adhesive S along the predefined bead path 105 (FIG. 1) provides for three areas or regions labeled 'A', 'B' and 'C' shown in FIG. 2C. And it is desirable that the three regions A-C be properly filled with the adhesive S such a desired hem joint HJ is formed. However, if the bead B is applied too close (−y direction) to or too far (+y direction) from the flange f, one or more of the regions A-C may have less than a desired amount of the adhesive S and the hem joint HJ may have less than desired performance.

Figure 3A:
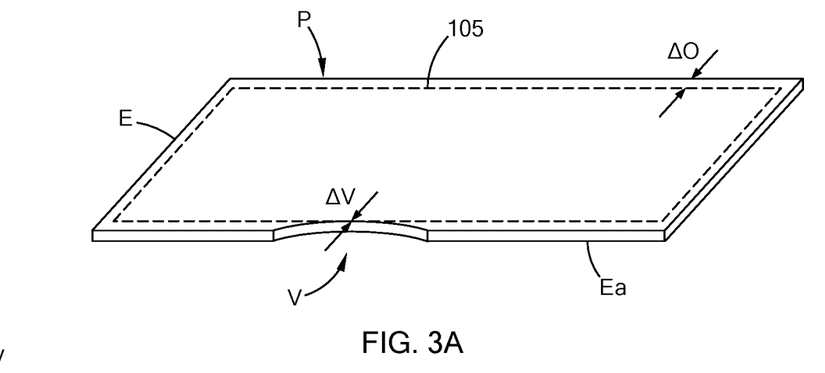
FIG. 3A is a perspective view of a panel with a variation proximal to an edge of the panel.

For example, and with reference to FIG. 3A, a variation 'V' in a panel P that can result in a bead B of adhesive S not being applied at a desired location proximal an edge E of the panel P is shown. Particularly, the variation V (e.g., an indent and/or unevenly cut or trimmed edge) is present along a length (x direction) of an edge 'Ea' such that the variation V extends into (+y direction) the panel P. In addition, a predefined global bead path 105 has a designed or desired offset 'ΔO' from the edge E as shown in FIG. 3A which does not take into account the variation V along the edge Ea. Accordingly, the variation V results in the predefine bead path 105 having an offset ΔV less than ΔO such that the predefined global bead path 105 and a bead B (not shown) of adhesive S applied by the traditional system 10 is closer or nearer (y direction) to the edge Ea than desired.

Figure 3B:
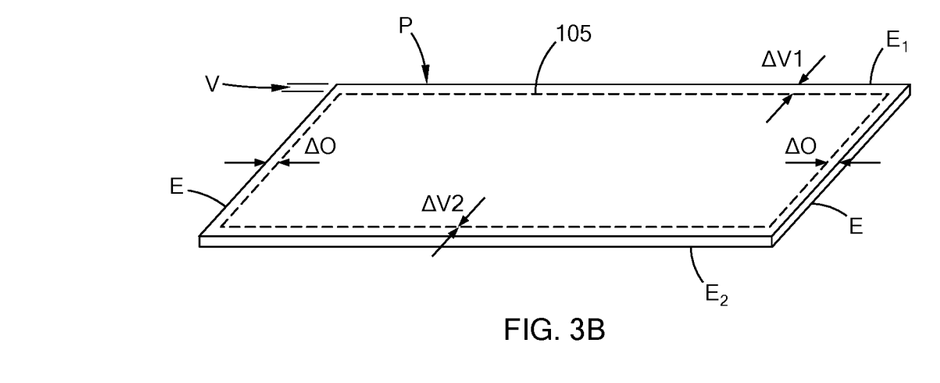
FIG. 3B is a perspective view of a panel with a variation in the form of a shift in the panel relative to a global bead path.

Referring to FIG. 3B another variation of the panel P relative to a predefined global bead path 105 is shown. Particularly, the panel P shown in FIG. 3B does not have an indent and/or unevenly cut or trimmed edge, however, the panel P has shifted (+y direction) such that the predefined global bead path 105 further away (ΔV1) than desired from an edge E1 of the panel P and closer (ΔV2) than desired from an edge E2 of the panel P. It should be understood that such a variation can occur due to tolerances and/or variations of fixtures used to hold the panel P during applying or dispensing the adhesive S to the panel P. It should also be understood that a panel P can include both types of variations shown in FIGS. 3A and 3B. In addition, it should also be understood that the panel P can be shifted (e.g., y direction), rotated about the x- and/or y-axis, and tilted or sloping with respect to the z-axis such that the panel P is offset from the predefined global bead path 105 (or the predefined global bead path 105 is offset from the panel P) along the x-, y-, and/or z-axis.

Figure 4:
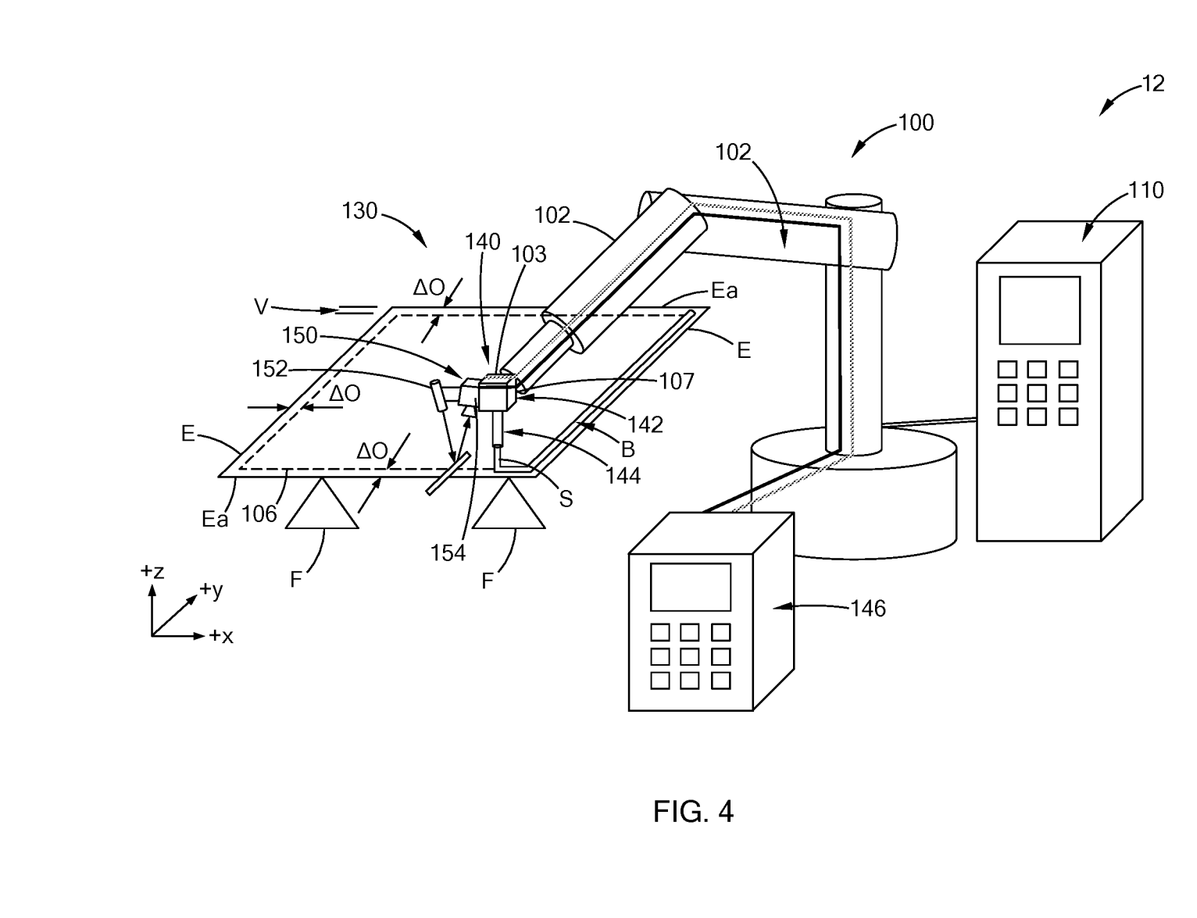
FIG. 4 is a perspective view of system for applying material to a part according to the teachings of the present disclosure.

Referring now to FIG. 4, a system 12 for applying material to a part according to the teachings of the present disclosure is shown. Particularly, the system 12 is configured to applying the adhesive S along a "feature-relative bead path" such that variations along a bead path are accounted for. For example, the system 12 applies the bead B of adhesive S along a feature-relative bead path 106 that is a specific or desired distance ΔO from the edge E and along an entire length (x direction) of the edge Ea.

The system 12 includes the robot 100 with the controller 110, and a feature-relative bead dispensing system 130 with an actuator-application nozzle assembly 140 and a feature detection system 150. The actuator-application nozzle assembly 140 includes an actuator 142, an application nozzle 144, and an actuator controller 146. The actuator 142 is configured to move the application nozzle 144 independent of the robot 100 and the at least one robot arm 102. That is, as the robot 100 moves the application nozzle 144 along the global bead path 105, the actuator 142 is configured to move the application nozzle 144 such that variations V along the global bead path 105 are accounted for and the feature-relative bead path 106 is provided as discussed in greater detail below.

Figure 5A:
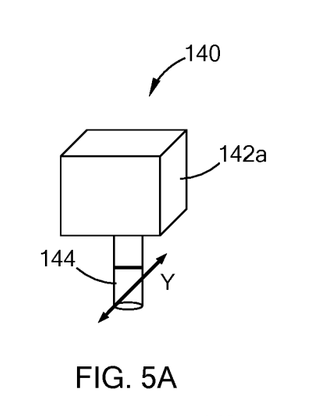
FIG. 5A is an actuator-application nozzle assembly according to one variation of the present disclosure.
Figure 5B:
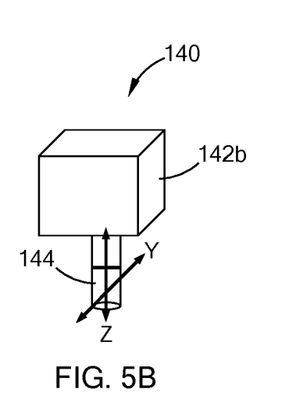
FIG. 5B is an actuator-application nozzle assembly according to another variation of the present disclosure.
Figure 5C:
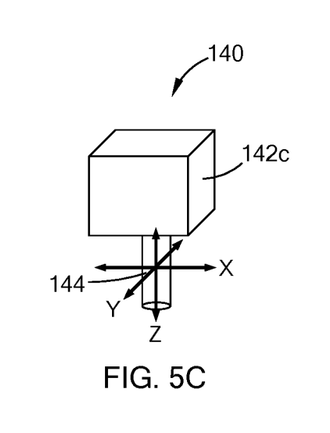
FIG. 5C is an actuator-application nozzle assembly according to still another variation of the present disclosure.
Figure 5D:
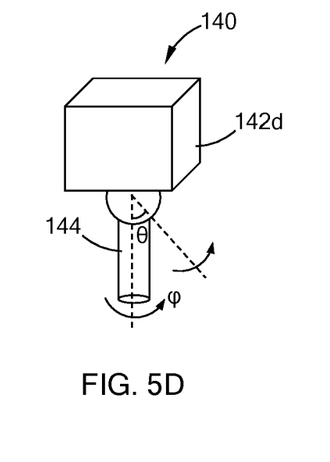
FIG. 5D is an actuator-application nozzle assembly according to yet still another variation of the present disclosure.
Figure 5E:
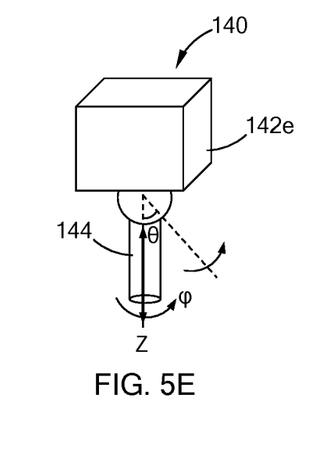
FIG. 5E is an actuator-application nozzle assembly according to one variation of the present disclosure.

Referring now to FIGS. 5A-5E, non-limiting examples of actuator-application nozzle assemblies 140 are shown. Particularly, FIG. 5A shows a one-dimensional (1D) actuator 142a coupled to an application nozzle 144 such that the application nozzle 144 is moveable in or along the y-direction shown in the figure, FIG. 5B shows a two-dimensional (2D) actuator 142b coupled to an application nozzle 144 such that the application nozzle 144 is moveable in or along the y-direction and the z-direction shown in the figure, and FIG. 5C shows a three-dimensional (3D) actuator 142c coupled to an application nozzle 144 such that the application nozzle 144 is moveable in or along the x-direction, the y-direction, and the z-direction shown in the figure. FIG. 5D shows a spherical and/or rotational actuator 142d coupled to an application nozzle 144 such that the application nozzle 144 is moveable along a spherical surface φ shown in the figure, and FIG. 5E shows a spherical-height actuator 142e coupled to an application nozzle 144 such that the application nozzle 144 is moveable along the spherical surface φ and in the z-direction shown in the figure.

The actuator-application nozzle assembly 140 is attached or couple to a distal end 103 (FIG. 4) of the robot arm 102. In some variations a robotic wrist 107 is coupled between the distal end 103 and the actuator-application nozzle assembly 140. That is, the robot wrist 107 is attached to the distal end 103 of the robot arm 102 and the actuator-application nozzle assembly 140 is attached to the robot wrist 107. In some variations of the present disclosure, the robot wrist 107 maintains a sensor or detector 154 (FIG. 4) and/or the actuator 142 in a perpendicular orientation relative to an edge E of the panel P such that an edge is detectable and/or followed. In addition, the robot wrist 107 enhances movement or tracking of the application nozzle assembly 140 at corners of the panel P such that the application nozzle assembly 140 travels in a "forward direction" and a single 1D actuator 142a can be used to accommodate variations along the y-axis shown in the figures or a 2D actuator 142b can be used to accommodate variations along the y-axis and the z-axis shown in the figures.

Referring back to FIG. 4, in some variations the feature detection system 150 includes a source 152 and a sensor or detector 154 (referred to herein simply as a "sensor"). In at least one variation the source 152 is a wavelength source 152 and the sensor is a wavelength sensor 154. Non-limiting examples of wavelength sources include electromagnetic radiation (EMR) sources such as a laser source or an infrared wavelength source, an ultrasonic wave source, among others, and non-limiting examples of wavelength sensors include EMR sensors (e.g., a laser sensor), ultrasonic sensors, among others. For example, a laser source 152 and a 1D sensor 154 are shown in FIG. 4. In some variations the sensor 154 comprises a sensor array such as a Hall-Effect sensor array and in at least one variation the sensor comprises an array of visible light sensors configured to detect a feature as a function of a change in the light intensity across the array. For example, the sensor 154 can be a 2D or 3D camera configured as a line scanner such that a feature is detected as a function of a change in the light intensity. In another variation, the sensor 154 uses laser triangulation to measure a distance from a feature to a predefined point to a feature. And in some variations the sensor 154 is a sensor on a rotating head.

Figure 6:
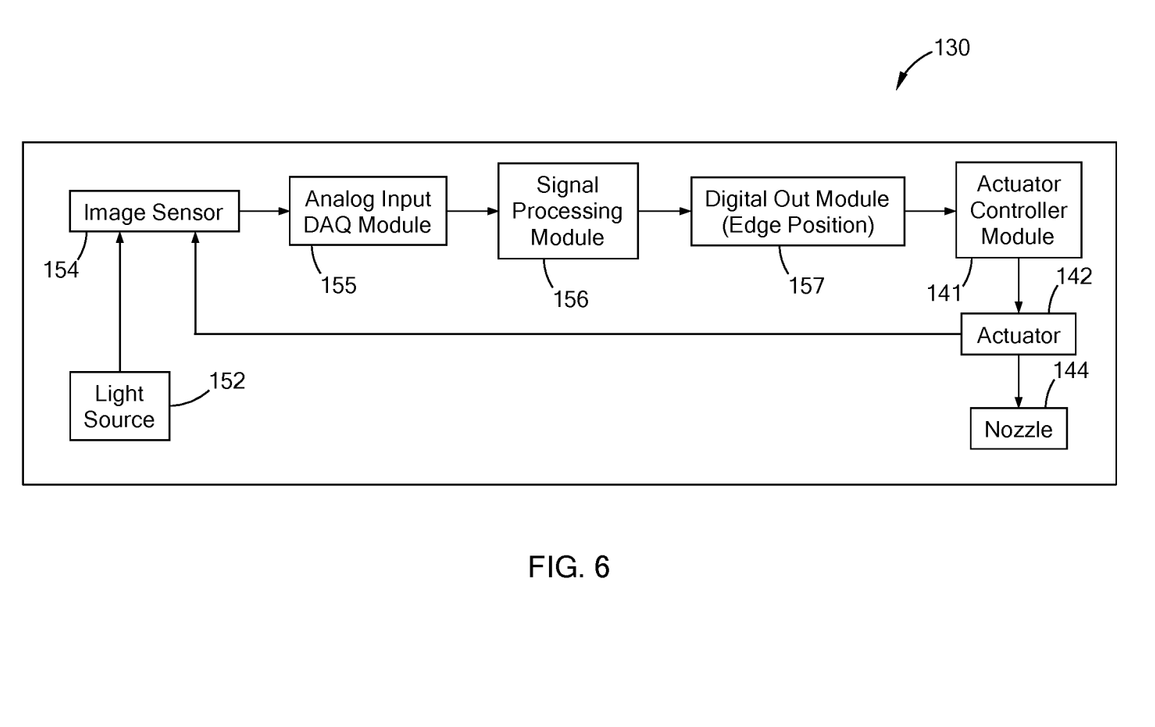
FIG. 6 is a block diagram of a feature detection system according to the teachings of the present disclosure.

Referring now to FIG. 6, a functional block diagram for a non-limiting example of the feature-relative bead dispensing system 130 is shown in which an image sensor 154 receives a signal from a light source 152. The signal is processed through an analog input data acquisition (DAQ) module 155, a signal processing module 156 and a digital out module 157. The digital out module 157 is configured to detect a feature position (e.g., an edge or groove position of a panel) and provide the detected feature to the actuator control module 141 which in turn is configured to direct the actuator 142 to move the application nozzle 144. Accordingly, the feature-relative bead dispensing system 130 provides imaging of an edge of a panel and real-time adjustment or movement of the application nozzle 144 via the actuator 142 as the robot 100 with the at least one robot arm 102 moves the application nozzle 144 across the panel P along a predefined global bead path. While FIG. 6 shows an analog input DAQ module 155 and a digital out module 157, it should be understood that the analog input DAQ module 155 can be a digital DAQ module or a mixed analog/digital DAQ module and the digital out module 157 can be an analog out module or a mixed digital/analog out module. Also, it should be understood that a response time of the image sensor 154, analog input data acquisition (DAQ) module 155, signal processing module 156, digital out module 157, actuator control module 141 and actuator 142 is faster than (less than) a response time of the robotic arm 102 and the geometric resolution of the actuator 142, and thus the application nozzle 144, is greater (finer or more accurate) than the geometric resolution of the robotic arm 102. Accordingly, and while the robot 100 may have sufficient accuracy and/or repeatability to desirably apply a bead B along a predefined global bead path 105, the feature-relative bead dispensing system 130 provides real-time scanning of an edge E of a panel P and any variations that may be present relative to the predefined global bead path 105. In this manner, a preconditioning step (prior to dispensing the adhesive S onto the panel P) such as pre-scanning the entire profile of the predefined global bead path 105 and/or taking an image of the entire panel P and recalculating a desired global path 105 on a part-by-part by basis is not needed or desired.

Figure 7:
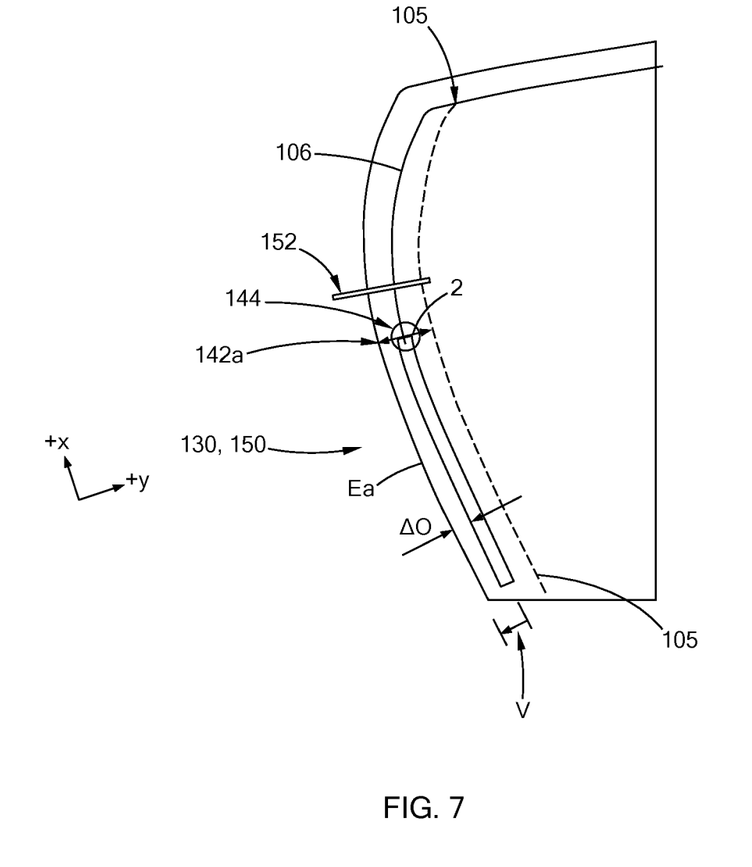
FIG. 7 is a perspective view of a panel with a variation along an edge of the panel and a variation-relative bead path according to the teachings of the present disclosure.

Referring now to FIG. 7, one non-limiting example of the feature-relative bead dispensing system 130 applying a bead B of sealant S onto a panel P is shown. The feature-relative bead dispensing system 130 shown in FIG. 7 includes the 1D actuator 142a in mechanical connection with the application nozzle 144 and is configured to move the application nozzle 144 in the direction indicated by the double-headed arrow 2. In addition, the robot 100 (not shown) with the at least one robot arm 102 (not shown) is configured to move the application nozzle 144 across the panel P along the predefined global bead path 105. And as shown in FIG. 7, the panel P has been shifted (e.g., due to fixture tolerances and/or variations and/or tolerance stack-up of components) such that the predefined global bead path 105 is not a desired distance ΔO from the edge Ea. However, and in accordance with the teachings of the present disclosure, as the robot 100 with the at least one robot arm 102 (and optionally with the robotic wrist 107), traverse the predefined global bead path 105, a laser source 152 of the feature detection system 150 radiates or provides a laser line across the edge Ea. Also, a laser sensor 154 detects a discontinuity of the laser line at the edge Ea such that the position of the edge Ea is determined relative to the application nozzle 144 and the actuator controller module 141 (FIG. 6) directs the actuator 142 to move the application nozzle 144 such that feature-relative bead path 106 is traversed and a bead B of the adhesive S is applied on the panel P at the desired offset distance ΔO along the edge Ea. Stated differently, as the robot 100 (not shown) with the at least one robot arm 102 moves according to the predefined global bead path 105, the feature detection system 150 detects the curvature at the corner C and directs the actuator 142 to move the application nozzle 144 inwardly (+y direction) such that a bead B of sealant S is applied to the panel at the desired offset distance ΔO form the edge Ea. In this manner, variations along the predefined global bead path 105 are accounted and accommodated for during the application of the sealant S.

Figure 8:
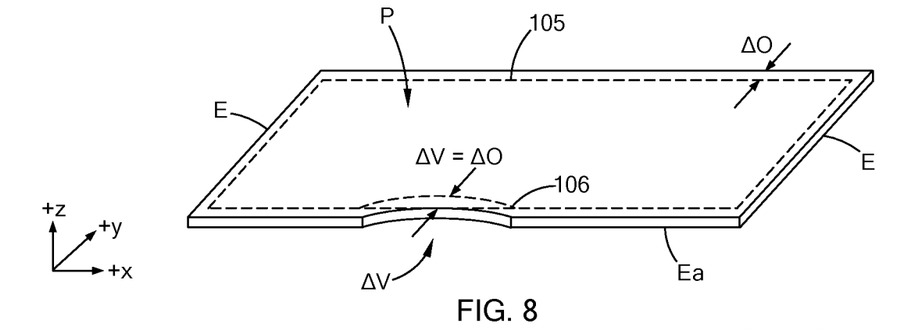
FIG. 8 is a top view of an actuator-application nozzle assembly according to one variation of the present disclosure moving along a variation-relative bead path according to the teachings of the present disclosure.

Referring now to FIG. 8, another type of variation 'V' in the form of an indent or reduction in a width (y direction) of the panel P is shown. In addition, and as explained with respect to FIG. 7, the application nozzle 144 of the feature-relative bead dispensing system 130 tracks or traverses the feature-relative bead path 106 and not the predefined global bead path 105 such that a bead B of adhesive S is applied consistently and/or uniformly at the desired offset distance ΔO along the edge E of the panel, even along the edge Ea where the variation V is present.

Figure 9A:
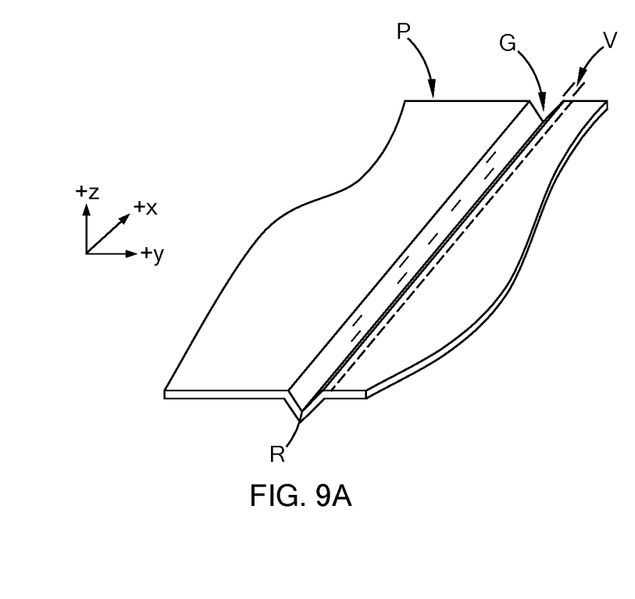
FIG. 9A is a perspective view of a panel with a variation along a groove of the panel.
Figure 9B:
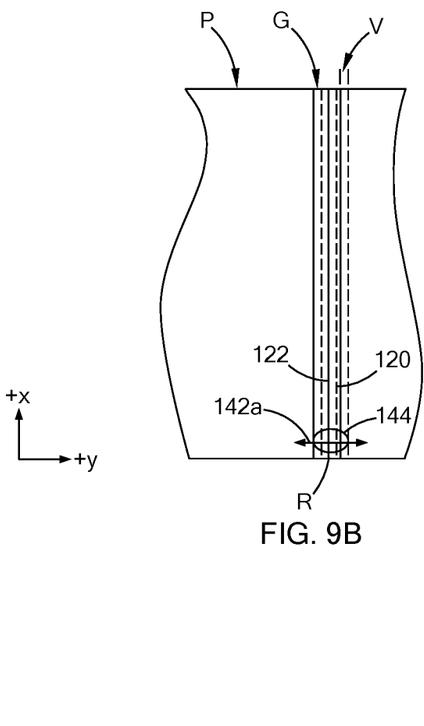
FIG. 9B is a top view of FIG. 9A shown a traditional global bead path and a variation-relative bead path according to the teachings of the present disclosure.

Referring to FIGS. 9A-9B, another type of variation V in the form of displacement of a groove is shown. Particularly, a panel P has a groove 'G' formed therein. For example the groove G can be a cosmetic roof ditch or groove made by adjoining two panels P (e.g., a split decklid of a vehicle). As shown in FIGS. 9A-9B, a variation V in the form of the groove G being displaced (−y direction) is shown and a predefined global bead path 120 fails to account for the variation V. However, and in accordance with the teachings of the present disclosure, as the robot 100 with the at least one robot arm 102 (and optionally with the robotic wrist 107), traverse the predefined global path 120, a laser source 152 of the feature detection system 150 radiates or provides a laser line across the groove G. Also, a sensor 154 (not shown) detects a displacement of the root R of the groove G such that the position of the root R is determined relative to the application nozzle 144. In the alternative, or in addition to, the sensor 154 detects edges 'e' of the groove G and the feature-relative bead dispensing system 130 tracks the root R via a center between the edges e. The actuator controller module 141 (FIG. 6) directs the actuator 142 to move the application nozzle 144 such that a feature-relative bead path 122 is traversed and a bead B (not shown) of the adhesive S is desirably applied within the groove G, even where the variation V is present. Stated differently, as the robot 100 (not shown) with the at least one robot arm 102 moves according to the predefined global bead path 120, the feature detection system 150 detects the displacement of the root R and directs the actuator 142 to move the application nozzle 144 inwardly (−y direction) such that a bead B of sealant S is desirably applied within the groove G.

Figures 10, 11A:
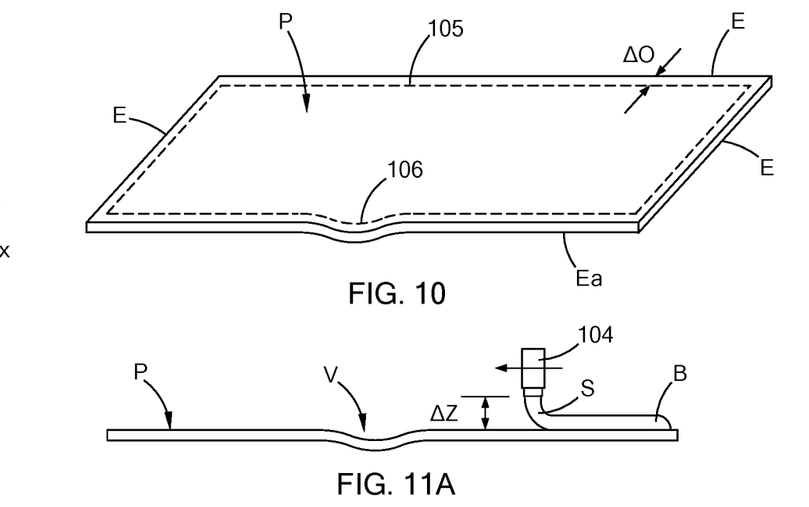
FIG. 10 is a perspective view of a panel with a variation along an edge of the panel.
FIG. 11A shows a traditional system for applying material to a part applying a bead of adhesive to the panel and approaching the variation in FIG. 10.
Figure 11B:
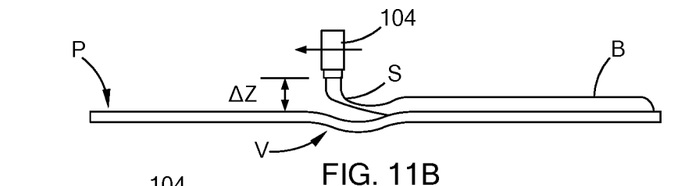
FIG. 11B shows the system in FIG. 11A applying the bead of adhesive to the panel and onto the variation in FIG. 10.
Figure 11C:
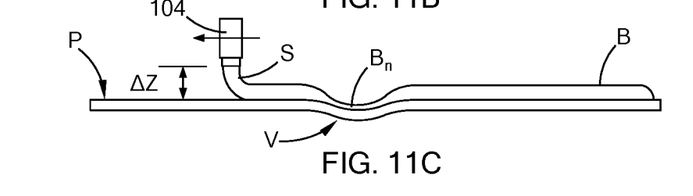
FIG. 11C shows the system fin FIG. 11A applying the bead of adhesive to the panel beyond the variation in FIG. 10.

Referring to FIG. 10, another type of variation V in the form of dent or displacement outside of the plane (−z direction) of a panel P is shown. Particularly, the variation V in the panel P is in the z direction shown in FIG. 10 such that a height of the predefined global bead path 105 changes along edge Ea. And while FIG. 10 shows the variation V in the form of a dent in the panel P, it should be understood that the variation V can be in the form of the entire panel P or a portion of the panel P being displaced in the z direction shown in FIG. 10 (e.g., due to tolerance and/or variation in fixture holding the panel P). It should also be understood that such variations can result in undesirable application of the adhesive S at the variation V location. For example, and with reference to FIGS. 11A-11C, application of the adhesive S using the traditional system 10 is shown with FIG. 11A showing the application nozzle 104 dispensing the adhesive S onto the panel P before reaching the variation V, FIG. 11B showing the application nozzle 104 dispensing the adhesive S onto the panel P at the variation V, and FIG. 11C showing the application nozzle 104 dispensing the adhesive S onto the panel P after the variation V. And as shown in FIGS. 11B and 11C, one factor effecting applying a desired bead B of the adhesive S on the panel P is a stand-off distance 'Δz' between the nozzle tip (not labeled) of the application nozzle 104 and the panel P. That is, the adhesive S has a given set of properties, including but not limited to yield strength and viscosity, and such properties in combination with the stand-off distance Δz at least partially determine the shape of the bead B applied to the panel P. In the alternative, or in addition to, a greater than desired stand-off distance can result in flow instability and/or bead swirl which can cause bead misplacement on the panel P. Accordingly, and as shown in FIGS. 11B-11C, when the application nozzle 104 fails to account for the variation V, a non-uniform bead portion Bn is formed on the panel P at the variation V.

Figure 12A:
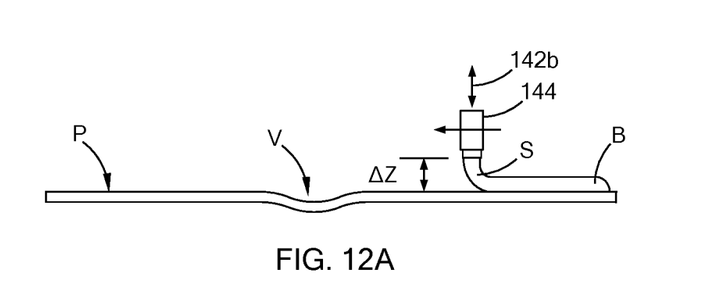
FIG. 12A shows a system for applying material to a part according to the teachings of the present disclosure applying a bead of adhesive to the panel and approaching the variation in FIG. 10.
Figure 12B:
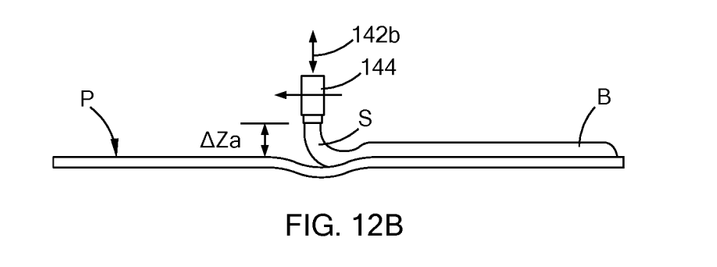
FIG. 12B shows the system in FIG. 12A applying the bead of adhesive to the panel and onto the variation in FIG. 10.
Figure 12C:
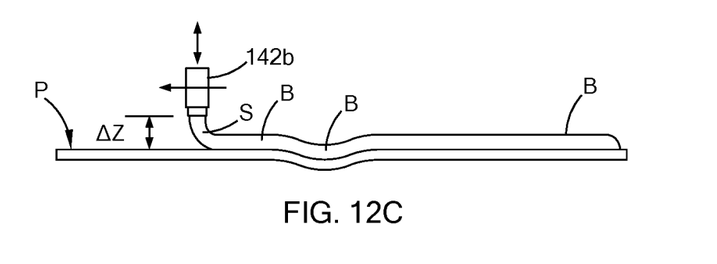
FIG. 12C shows the system in FIG. 12A applying the bead of adhesive to the panel beyond the variation in FIG. 10.

In contrast, and with reference to FIGS. 12A-12C, the system 12 with the feature-relative bead dispensing system 130 and the 2D actuator 142b accounts for the variation V such that a uniform bead B is applied to the panel P, even where the variation V is present. Particularly, as the robot 100 with the at least one robot arm 102 (and optionally with the robotic wrist 107), traverse a predefined global bead path 105, a laser source 152 (not shown) of the feature detection system 150 radiates or provides a laser line across the predefined global bead path 105. Also, a sensor 154 (not shown) detects a displacement of the panel P in the z direction such that the surface the panel P is determined relative to the application nozzle 144. The actuator controller module 141 (FIG. 6) directs the actuator 142 to move the application nozzle 144 such that a feature-relative bead path 106 is traversed and a bead B (not shown) of the adhesive S is desirably applied along the edge Ea, even where the variation V is present. Accordingly, as the robot 100 (not shown) with the at least one robot arm 102 moves according to the predefined global bead path 105, the feature detection system 150 detects the displacement of the panel in the z direction and directs the actuator 142 to move the application nozzle 144 downwardly (−z direction) such that a predefined stand-off distance Δz is maintained and a bead B of sealant S is desirably applied along the feature-relative bead path 106.

Figure 13:
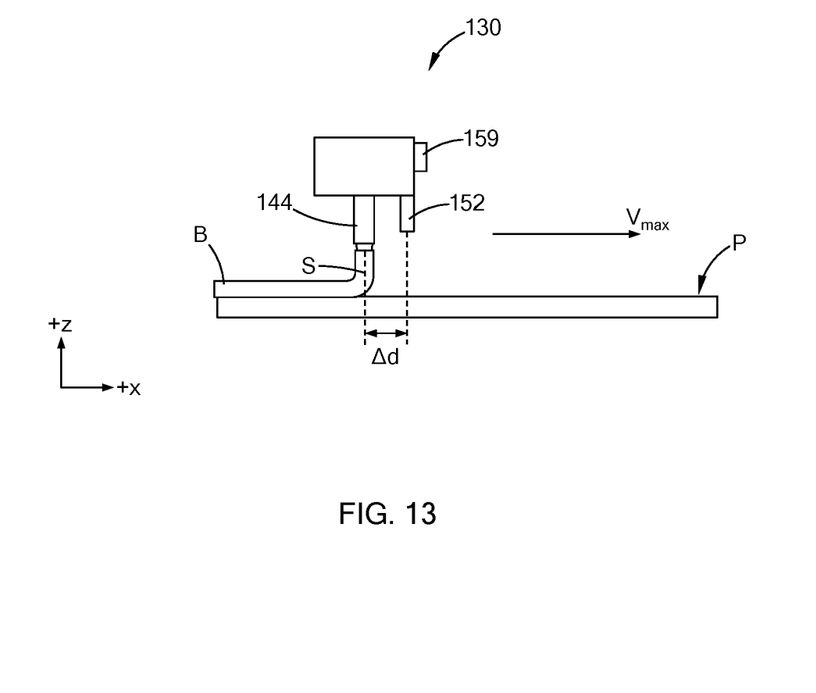
FIG. 13 is a side view of a system for applying material to a part with a time delay feature according to the teachings of the present disclosure.

Referring to FIG. 13, it should be understood that a time delay can be present between detection of a variation V by the feature detection system 150 and movement of the application nozzle 144 by the actuator 142. Accordingly, in some variations of the present disclosure the feature-relative bead dispensing system 130 includes a "look-ahead" feature configured to account for such a time delay. In such variations the feature-relative bead dispensing system 130 can include a sensor 154 positioned upstream (ahead) of the application nozzle 144 by a predefined "look-ahead" distance Δd. In some variations, the sensor 154 is positioned upstream of the application nozzle 144 as a function of a speed 'v' that the robot 100 moves the application nozzle 144 across the panel P. For example, and with a total response time of the feature-relative bead dispensing system 130 equal to Δt, the look-ahead distance Δd is equal to:

$$\Delta d = v \times \Delta t \quad (Eq. 1)$$

And assuming an application nozzle speed v of 600 millimeters per second (mm/s) and a total response time Δt of 20 milliseconds, the look-ahead distance Δd is 12 mm.

In some variations the application nozzle speed v changes during dispensing of the adhesive S. For example, the system 20 may apply adhesive S along a first portion of the panel P at a first application nozzle speed $v_1$ and apply the adhesive S along a second portion of the panel P at a second application nozzle speed $v_2$ that is different than the first application nozzle speed $v_1$. In the alternative, or in addition to, the nozzle speed changes at a corner of the panel P. In such variations, a desired time delay from movement of the application nozzle (via the actuator) at a slower speed than a maximum speed '$v_{max}$' of the application nozzle can be determined according to:

$$t_{delay} = ((v_{max} - v_i) \times \Delta t)/v_{max} \quad (Eqn. 2)$$

And assuming a maximum application nozzle speed $V_{max}$ equal to 600 mm/s and a total response time Δt of 20 ms, Table 1 below (e.g., a look-up table) shows calculated time delays $t_{delay}$ for application nozzle speeds $v_i$ equal to 500 mm/s, 400 ms, 300 mm/s, 200 mm/s, and 100 mm/s. Also, in some variations a predefined robot speed based on or along a predefined global bead path 105 can be used at various locations along the predefined global bead path 105 to determine a time delay at a given point or location.

TABLE 1

| Application Nozzle Velocity (mm/s) | Time delay (ms) |
|---|---|
| 600 | 0.0 |
| 500 | 3.3 |
| 400 | 6.7 |
| 300 | 10.0 |
| 200 | 13.3 |
| 100 | 16.7 |

In some variations the feature-relative bead dispensing system 130 includes a speed sensor 159 configured to detect the current speed '$v_i$' of the application nozzle 144 and transmit the current speed $v_i$ to the actuator controller 146. And in such variations the actuator controller 146 is configured to calculate the time delay $t_{delay}$ for the current speed $v_i$ such that the actuator 142 delayed (e.g., see Table 1) in moving the application nozzle 144 when the current speed $v_i$ is less than the maximum speed $v_{max}$ of the application nozzle 144.

Figure 14A:
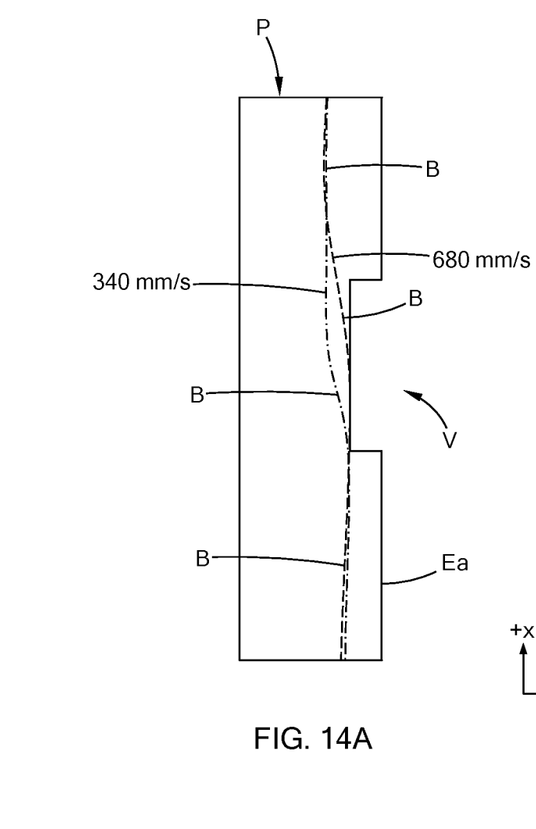
FIG. 14A is a top view of a panel with an edge variation and a variation-relative bead path formed by a system for applying material to a part according to the teachings of the present disclosure without a "look ahead" feature.
Figure 14B:
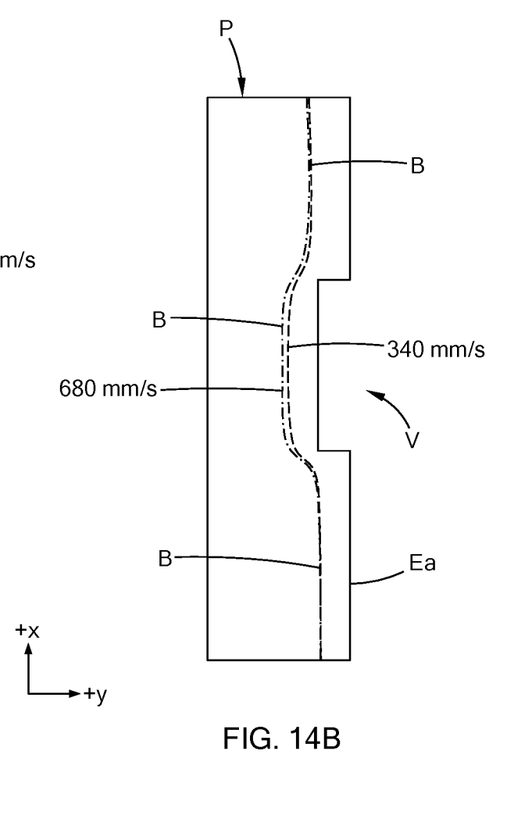
FIG. 14B is a top view of a panel with an edge variation and a variation-relative bead path formed by a system for applying material to a part according to the teachings of the present disclosure with a "look ahead" feature.

Referring now to FIGS. 14A-14B, testing and test results for a system 20, using a feature-relative bead dispensing system 130 without (FIG. 14A) and with (14B) a look-ahead distance Δd, are shown for dispensing adhesive S (shown as dotted lines in the figures) along an edge Ea of a plate P with a variation V. Particularly, the system 20 had a maximum application nozzle speed $v_{max}$ equal to 680 mm/s and a total response time Δt of 20 ms. Accordingly, the look-ahead distance Δd between the sensor 154 and the application nozzle 144 was calculated to be, and set at, 13.6 mm. In addition, one profile or bead path was executed at the maximum application nozzle speed $v_{max}$ (i.e., 680 mm/s) and another profile or bead path was executed at $v_i$ equal to 340 mm/s. And as shown by comparing FIGS. 14A and 14B, the system 20 with the look-ahead distance Δd (FIG. 14B) executed an enhanced or improved profile or bead path that accounted for the variation V.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for applying material to a substrate, the system comprising:
   an application nozzle attached to a distal end of a robotic arm, wherein the robotic arm is configured to traverse a predefined path such that the application nozzle traverses a predefined global bead path across and spaced apart from the substrate;
   a sensor coupled to the distal end of the robotic arm and an actuator mechanically coupled to and configured to move the application nozzle, wherein the sensor is configured to sense a first location on the substrate that is spaced apart from a second location on the substrate by a distance, the second location being a location at which the application nozzle is configured to deposit the material, the distance being based on a response time of the sensor and one or more nozzle speeds of the application nozzle; and
   a controller in communication with the actuator and configured to receive data from the sensor and detect a feature of the substrate based on the data received from the sensor, and direct the actuator to move the application nozzle independent of the distal end of the robotic arm such that a bead of the material flowing out of the application nozzle is applied to the substrate along a feature-relative bead path, and wherein the controller is configured to control the actuator to move the application nozzle based on the response time and the one or more nozzle speeds.

2. The system according to claim 1, wherein the feature is at least one of an edge of the substrate, a groove of the substrate, and a groove between two substrates.

3. The system according to claim 1, wherein the actuator is a one dimensional actuator.

4. The system according to claim 3, wherein the one dimensional actuator and the sensor are oriented parallel to each other.

5. The system according to claim 1, wherein the actuator is a two-dimensional actuator.

6. The system according to claim 5, wherein the two-dimensional actuator is configured to move the application nozzle in a direction normal to the substrate such that the application nozzle maintains a predefined stand-off distance from the substrate as the application nozzle traverses the predefined global bead path across the substrate.

7. The system according to claim 1, wherein the actuator is a three-dimensional actuator.

8. The system according to claim 7, wherein the three-dimensional actuator is configured to move the application nozzle in a direction normal to the substrate such that the application nozzle maintains a predefined stand-off distance from the substrate as the application nozzle traverses the predefined global bead path across the substrate.

9. The system according to claim 1 further comprising an electromagnetic radiation (EMR) source and wherein the sensor is a linear EMR sensor.

10. The system according to claim 9, wherein the EMR source is a 2D laser array configured to raster a line scan such that an edge of the substrate and a distance between the substrate and the application nozzle are determined by the controller.

11. The system according to claim 1, wherein the sensor comprises at least one of a 2D camera and a 3D camera configured as a line scanner.

12. The system according to claim 1, wherein the controller is configured to control a movement of the application nozzle based on a time delay.

13. The system according to claim 12, wherein the time delay is a function of a predefined linear speed of the robotic arm.

14. The system according to claim 12 further comprising a speed sensor coupled to and configured to detect a linear speed of the distal end of the robotic arm.

15. The system according to claim 14, wherein the time delay is a function of a current linear speed of the distal end of the robotic arm detected by the speed sensor.

16. A system for applying material to a substrate, the system comprising:
   an application nozzle attached to a distal end of a robotic arm, wherein the robotic arm is configured to traverse a predefined path such that the application nozzle traverses a predefined global bead path across and spaced apart from the substrate;
   a sensor coupled to the distal end of the robotic arm and an actuator mechanically coupled to and configured to move the application nozzle, wherein the sensor is configured to sense a first location on the substrate that is spaced apart from a second location on the substrate by a distance, the second location being a location at which the application nozzle is configured to deposit the material, the distance being based on a response time of the sensor and one or more nozzle speeds of the application nozzle; and a controller in communication with the actuator and configured to receive image data from the sensor and detect a feature of the substrate based on the data received from the sensor, and direct the actuator to move the application nozzle independent of the distal end of the robotic arm such that a bead of the material flowing out of the application nozzle is applied to the substrate along a feature-relative bead path, and wherein the controller is configured to control a movement of the application nozzle based on the response time and the one or more nozzle speeds.

17. The system according to claim 16, wherein the feature is at least one of an edge of the substrate, a groove of the substrate, and a root of a groove of the substrate.

18. The system according to claim 16, wherein the actuator is one of a one-dimensional actuator, a two-dimensional actuator and a three-dimensional actuator, and the two-dimensional actuator and the three-dimensional actuator are configured to move the application nozzle in a direction normal to the substrate such that the application nozzle maintains a predefined stand-off distance from the substrate as the application nozzle traverses the feature-relative bead path across the substrate.

19. A system for applying material to a substrate, the system comprising:
an application nozzle attached to a distal end of a robotic arm, wherein the robotic arm is configured to traverse a predefined path such that the application nozzle traverses a predefined global bead path across and spaced apart from the substrate;
a sensor coupled to the distal end of the robotic arm upstream from the application nozzle and an actuator mechanically coupled to and configured to move the application nozzle, wherein the sensor is configured to sense a first location on the substrate that is spaced apart from a second location on the substrate by a distance, the second location being a location at which the application nozzle is configured to deposit the material, the distance being based on a response time of the sensor and one or more nozzle speeds of the application nozzle; and
a controller in communication with the actuator and configured to receive image data from the sensor and detect a feature of the substrate based on the data received from the sensor, and direct the actuator to move the application nozzle with a time delay after the feature of the substrate is detected and independent of the distal end of the robotic arm such that a bead of the material flowing out of the application nozzle is applied to the substrate along a feature-relative bead path, and wherein the controller is configured to control the actuator to move of the application nozzle based on the response time and the one or more nozzle speeds.

20. The system according to claim 19 further comprising a speed sensor coupled to and configured to detect a linear speed of the distal end of the robotic arm, wherein the time delay is a function of a current linear speed of the distal end of the robotic arm detected by the speed sensor.

* * * * *